United States Patent [19]

Halin

[11] Patent Number: 5,528,897
[45] Date of Patent: Jun. 25, 1996

[54] FUEL SUPPLY SYSTEM FOR A GAS TURBINE ENGINE

[75] Inventor: Yves R. Halin, Saint Germain Les Corbeil, France

[73] Assignee: Societe Nationale d'Etude et de Construction de Moteurs d'Aviation S.N.E.C.M.A., Paris, France

[21] Appl. No.: 413,448

[22] Filed: Mar. 30, 1995

[30] Foreign Application Priority Data

Apr. 13, 1994 [FR] France ................................ 94 04332

[51] Int. Cl.⁶ ............................................. F02C 7/232
[52] U.S. Cl. ............................ 60/39.094; 60/741
[58] Field of Search ........................ 60/39.094, 734, 60/739, 740, 741

[56] References Cited

U.S. PATENT DOCUMENTS

| | | |
|---|---|---|
| 2,591,880 | 4/1952 | Sammons . |
| 2,877,839 | 3/1959 | Cody ........................ 60/39.094 |
| 3,103,229 | 9/1963 | Smith ........................ 60/39.094 |
| 4,984,424 | 1/1991 | Shekleton .................. 60/39.094 |

FOREIGN PATENT DOCUMENTS

| | | |
|---|---|---|
| 227273 | 7/1987 | European Pat. Off. . |
| 831670 | 3/1960 | United Kingdom . |
| 2134244 | 8/1984 | United Kingdom . |

*Primary Examiner*—Louis J. Casaregola
*Attorney, Agent, or Firm*—Bacon & Thomas

[57] ABSTRACT

A fuel supply system for a gas turbine engine is disclosed which incorporates a discharge conduit into the fuel supply system such that an increase in the temperature of the fuel in the fuel injector conduits after engine shut-down will cause a valve in the discharge line to open before the opening of the valve in the fuel injector conduit, thereby directing excess fuel to a receiver or a tank, rather than into the hot combustion chamber. A fuel flow valve is connected to the fuel supply conduit, the discharge conduit, as well as the fuel injector conduits. Under normal operating conditions, a valve member within the fuel flow valve is positioned so as to enable communication between the fuel feed conduit and the fuel injector conduits so that fuel may be supplied to the fuel injectors. When the valve element is moved the a second position, after engine shut-down, it seals off the fuel feed conduit and enables communication between the fuel injector conduits and the discharge conduit. A valve in the discharge conduit is set so as to open at a slightly lower pressure than are the valves in the fuel injector conduits such that, if the fuel remaining in the fuel injector conduits is heated, its rise in pressure will cause the discharge valve to open before the opening of the fuel injector valve. Thus, a portion of the heated fuel may then be directed to a receiver or a tank.

6 Claims, 2 Drawing Sheets

FUEL SUPPLY SYSTEM FOR A GAS TURBINE ENGINE

BACKGROUND OF THE INVENTION

The present invention relates to a fuel supply system for a gas turbine engine, more particularly such a system having a valve controlled discharge conduit to prevent heated fuel in the fuel injector conduits from being injected into the combustion chamber wherein the engine is stopped.

Aircraft, including the turbojet engines which act as power plants, are subjected to exceedingly strict safety regulations. Such safety regulations mandate that malfunctions of the fuel supply systems are designed to preclude multiple or latent malfunctions. However, operational requirements may require a design that does not fully meet the malfunction analysis. Obviously, such design choices incur only at a secondary level and do not impair the safety of the aircraft.

In the case of a design for a fuel injector manifold and associated fuel injectors, operational requirements dictate that the fuel supply system and fuel injector conduits not be purged when the jet engine is stopped in order to minimize subsequent engine start-up time. If the fuel were purged from the manifolds and injectors, it would be necessary to have these components again be filled with fuel prior to starting the engine. Such additional fuel filling time, when added on to the ordinary engine start-up time, results in an excessive delay.

However, when a jet engine is stopped and the high pressure portion of the fuel system is not purged, heat radiating from the stopped engine will heat the fuel in the unpurged fuel supply system, thereby causing the fuel to increase in pressure and incur the possibility of inadvertent opening of the fuel injector valve, thereby spraying fuel onto the hot combustion chamber walls. Such may result in the ignition of the fuel sprayed into the combustion chamber and generate flames through the turbine and into the engine exhaust duct. Since the engine is stopped and the aircraft is on the ground, such inadvertent ignition of fuel is a potential danger to ground personnel. This phenomenon is more common in hot weather and with highly volatile jet fuels, such as JP4.

SUMMARY OF THE INVENTION

A fuel supply system for a gas turbine engine is disclosed which incorporates a discharge conduit into the fuel supply system such that, increasing of the temperature of the fuel in the fuel injector conduits after engine shut-down will cause a valve in the discharge line to open before the opening of the valve in the fuel injector conduit, thereby directing the fuel to a receiver or a tank, rather than into the hot combustion chamber. A fuel flow valve is connected to the fuel supply conduit, the discharge conduit, as well as the fuel injector conduits. Under normal operating conditions, a valve member within the fuel flow valve is positioned so as to enable communication between the fuel feed conduit and the fuel injector conduits so that fuel may be supplied to the fuel injectors. When the valve element is moved the a second position, after engine shut-down, it seals off the fuel feed conduit and enables communication between the fuel injector conduits and the discharge conduit. A valve in the discharge conduit is set so as to open at a slightly lower pressure than are the valves in the fuel injector conduits such that, if the fuel remaining in the fuel injector conduits is heated, its rise in pressure will cause the discharge valve to open before the opening of the fuel injector valve. Thus, a portion of the heated fuel may then be directed to a receiver or a tank.

An object of the present invention is to prevent an unintended and undesirable flow of fuel into the combustion chamber so as to prevent ignition of the fuel upon contact with the hot combustion chamber surfaces. The present invention prevents the rise in pressure caused by engine heat, in the injection manifold even when highly volatile fuels are utilized when the engine is stopped, by discharging a portion of the fuel in the manifold into a discharge circuit when the fuel pressure is increased by a rise in temperature.

Accordingly, the invention concerns a fuel supply system for supplying fuel to fuel injectors in a gas turbine engine, such as a turbojet engine, and comprises a pressurized fuel source, including a fuel tank, a fuel feed conduit connected to the fuel source, at least one fuel distribution circuit having at least one fuel injector, each fuel injector communicating with a fuel injector conduit and having an injector valve set to open at a specified pressure common to all of the injector valves, and a fuel flow valve which is connected to the fuel feed conduit and each of the fuel injector conduits movable between a first position wherein the fuel feed conduit communicates with the fuel injector conduits and a second position in which such communication is prevented. The invention also includes a discharge conduit connected to the fuel flow valve having a discharge valve which opens at a fuel pressure lower than the fuel pressure which opens the fuel injector valves. The discharge conduit communicates with the fuel flow valve such that, when the movable valve dement is in a second position which prevents communication between the fuel feed conduit and the fuel injector conduit, the fuel injector conduits are in communication with the discharge conduit. Thus, any pressure increase in the fuel within the fuel injector conduits will cause the discharge valve to open before any of the fuel injector valves so that a portion of the fuel may be vented into the discharge conduits.

The pressure at which the discharge valve opens is chosen so as to be very close to the pressure at which the fuel injector valves open. In this fashion, only a small portion of the fuel will be vented through the discharge conduit and the fuel injector conduits, as well as the fuel feed valve, will remain substantially filled with fuel so as to minimize subsequent engine start-up time. Preferably, the pressure at which the discharge valve opens is less than the pressure at which the fuel injector valves open, but more than 0.9 times the pressure at which the fuel injector valves open.

The fuel flow valve has a movable valve member which can seal the fuel feed conduit and which, in its second position, is linked to a return device and to a fluid actuator which opposes the return device such that, high fuel pressure acting on the movable valve member urges it toward its first position and application of high fuel pressure on both sides of the movable valve element will cause the valve element to move to its second position. The fuel flow valve may have a body fitted with a purging junction in which a purge conduit is affixed and the discharge conduit may be connected to the purging junction.

DETAILED DESCRIPTION OF THE PREFERRED EMBODIMENTS

Figure 1:
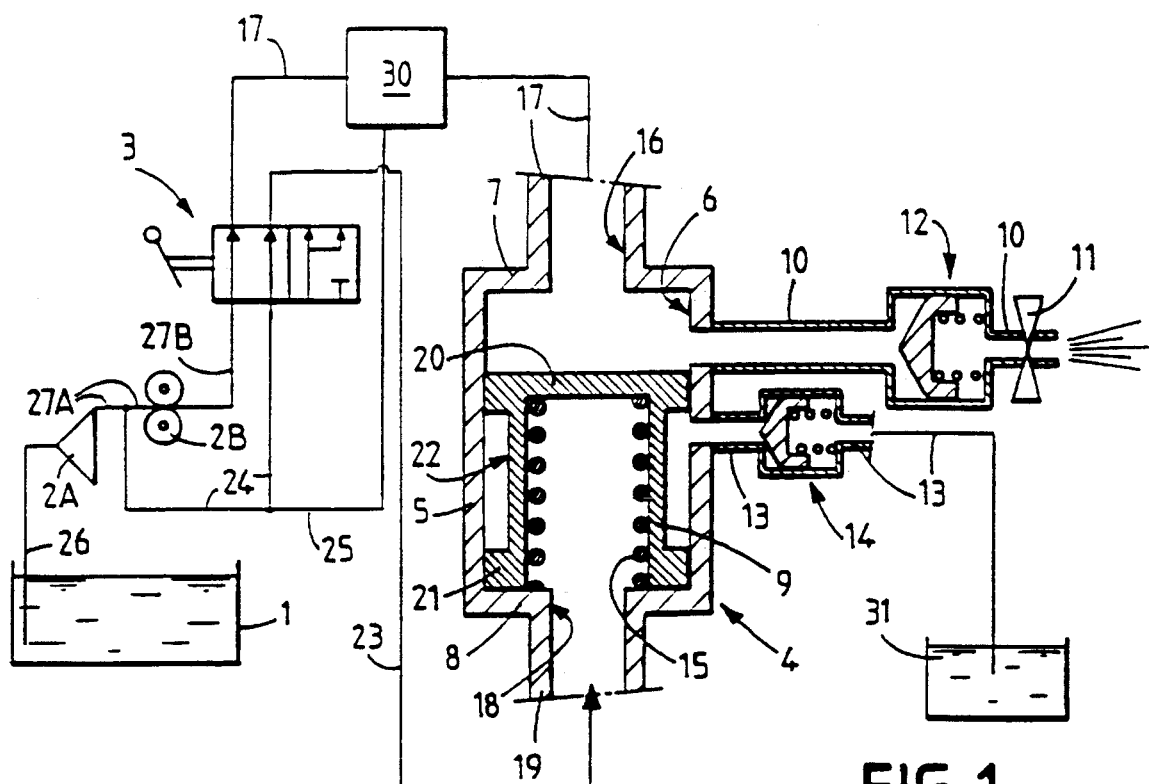
FIG. 1 is a schematic diagram of the fuel supply system according to the present invention showing the movable valve element of the fuel flow valve in its first position.
Figure 2:
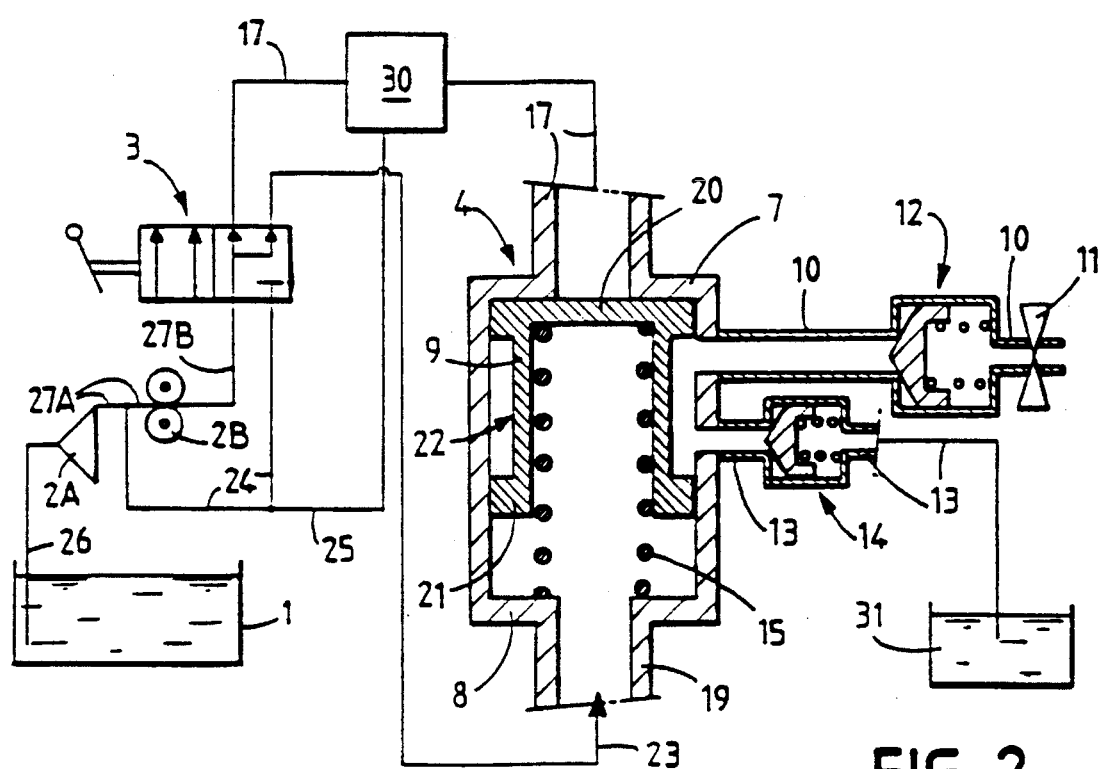
FIG. 2 is a schematic diagram similar to FIG. 1, illustrating the movable valve element of the fuel flow valve in its second position.

The fuel supply system according to the present invention is illustrated in FIGS. 1 and 2 as a fuel feed circuit for supplying fuel to fuel injectors of a gas turbine engine, such as an aircraft turbojet engine. The fuel feed system comprises a fuel tank 1, a low pressure fuel feed pump 2A, a high pressure fuel feed pump 2B and a two position fluid distribution valve 3. The system also includes a fuel flow valve 4 comprising a body 5 defining a valve chamber 6 having opposite ends 7 and 8 which extend transversely to the longitudinal axis of the chamber 6, and a valve member 9 movable inside the chamber 6 between the opposite ends 7 and 8. Fuel injector conduits 10 are connected to the valve body 5 and communicate with the chamber 6 so as to supply fuel to the fuel injectors 11 through the injector valves 12. Injector valves 12 are mounted in the fuel injector conduits 10 upstream of the fuel injectors 11 and such an injector valve is mounted in each of the fuel injector conduits 10 between the fuel injector 11 and the fuel flow valve 4. Each of the injector valves 12 are spring biased toward a closed position (as illustrated in FIG. 2) and are set to open at a fuel pressure of P12, all of the injector valves 12 being set to open at the same specified pressure.

The fuel supply system also includes a discharge conduit 13 connected to the valve body 5 so as to communicate with the chamber 6, the discharge conduit 13 being connected to a receiver or other receptacle 31. A discharge valve 14 is located in the discharge conduit 13 and comprises a valve element biased toward the closed position so as to normally prevent fluid flow through the discharge conduit 13. The discharge valve 14 is set to open at a fuel pressure P14 that is preferably near the fuel pressure P12, but slightly less. Preferably, 0.9 P12< P14< P12.

Fuel flow valve 4 has a spring 15 located between the valve member 9 and the end 8 so as to bias the valve member 9 toward the position illustrated in FIG. 2. A first adaptor 16 extends from the end 7 of the valve body 5 and allows communication between the chamber 6 and the external fuel feed conduit 17. A main fuel regulator 30 is located in fuel feed conduit 17 so as to regulate the fuel supply between the fuel distributor valve 3 and the first adaptor 16. A second adaptor 18 extends from the opposite end 8 of the fuel flow valve body 5 and also communicates with the chamber so as to connect the chamber to the external conduit 19.

Valve member 9 has opposite facing pistons 20 and 21 located such that the piston 21 bears against end 8 in the first position of the valve member 9, while the other piston 20 seals or bears against the end 7 in the second position of the valve member 9 (illustrated in FIG. 2). Annular channel 22 is defined around the axial periphery of the valve member 9 between the pistons 20 and 21. Conduit 23 is connected to conduit 19 such that fuel flowing through these conduits will act on the valve member 9 and, in conjunction with the force spring 15, will urge the valve member 9 toward its second position, illustrated in FIG. 2. In this position, piston 20 will seal against the end 7 and prevent fuel from entering the chamber 6 through the fuel feed conduit 17. The annular channel 22 will enable communication between the fuel injector conduits 10 and the discharge conduit 13. As can be seen in FIG. 1, when the movable valve member 9 is in its first position, piston 20 allows communication between the fuel feed conduit 17 and the fuel injector conduits 10, but seals off the discharge conduit 13.

Output conduit 27A of the low pressure pump 2A is connected to the inlet or suction conduit of high pressure fuel pump 2B. The output conduit 27B of the high pressure pump 2B is connected to the fluid distribution valve 3. Conduit 24 connects the low pressure output conduit 27A to the fluid distribution valve 3. Conduit 25 is a fuel return connecting the main fuel regulator 30 to the conduit 24. The inlet or suction conduit 26 of the pump 2A is connected to the fuel tank 1, which may be pressurized. Fuel feed conduit 17 connects the fluid distribution valve 3 to the main fuel regulator and, in turn, to the fluid flow valve 4.

The position of the movable valve member 9 is determined by the position of the fluid distribution valve 3. When the fluid distribution valve 3 is in its first position, illustrated in FIG. 1, the high pressure output conduit 27B is connected to the fuel feed conduit 17 such that high pressure fuel from the conduit 17 enters the fuel flow valve 4 via the first adaptor 16 and acts on piston 20. The opposite end of the movable valve member 9, piston 21, is acted on by low pressure fuel via conduits 24, 23 and 19. Thus, the high pressure fuel acting on piston 20 will force the movable valve member 9 toward the position illustrated in FIG. 1, overcoming the force of spring 15 as well as the force generated by the low pressure fuel acting on the movable valve member.

As illustrated in FIG. 2, when the fluid distribution valve 3 is moved to its second position, the fuel feed conduit 17 is still connected to the high pressure fuel outlet conduit 27B. However, the high pressure output conduit 27B is also connected to conduit 23 such that high fuel pressure is now also applied to the piston 21 of the valve member 9. Since the high pressure fuel is acting on both sides of the movable valve member, the force of the spring 15 will urge the valve member 9 to its second position, illustrated in FIG. 2. In this position, piston 20 seals off the fuel fluid conduit 17 and the annular channel 22 enables communication between the fuel injector conduits 10 and the discharge conduit 13. In both its first and second positions, the valve member 9 prevents fluid communication between the conduit 19 and all other fluid conduits.

Figure 3:
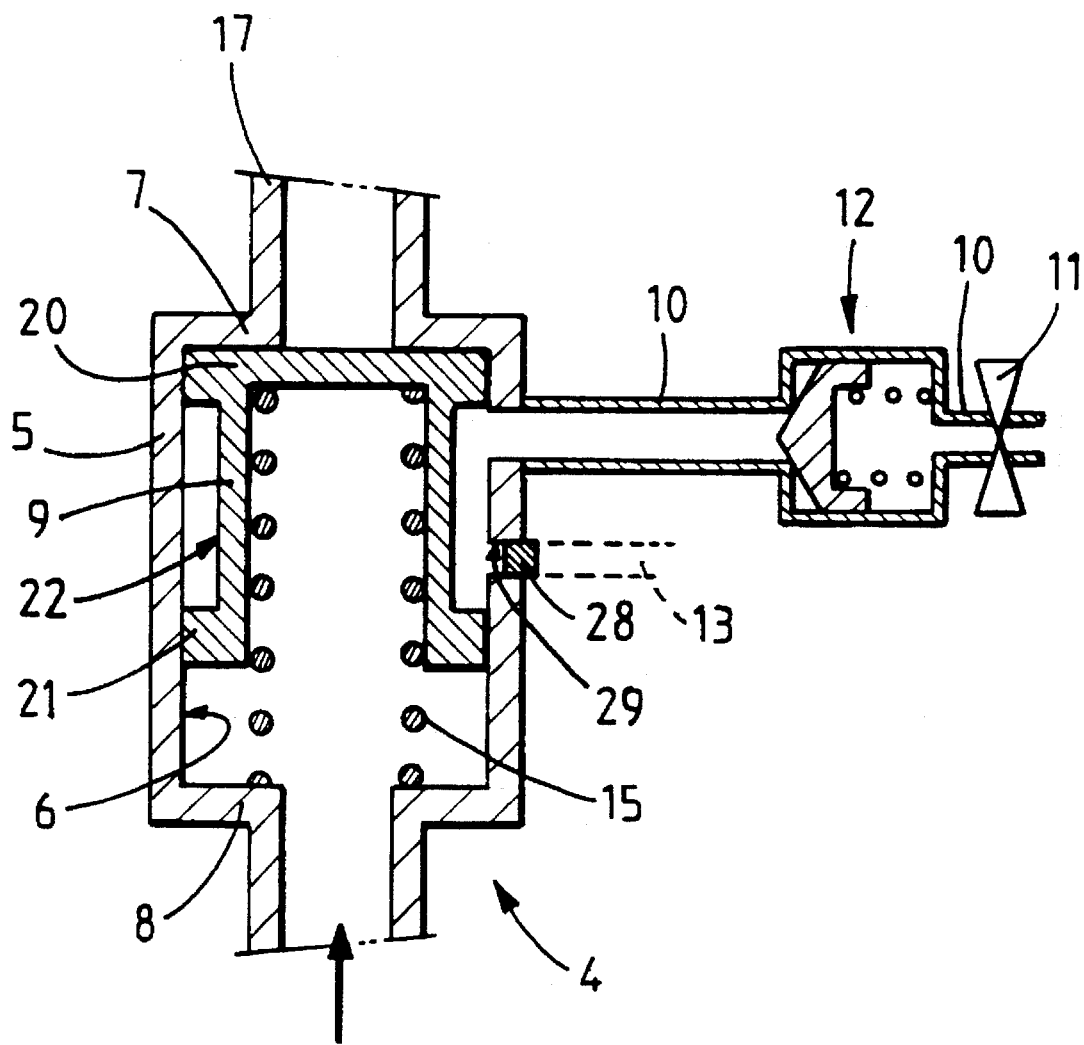
FIG. 3 is a partial, cross-sectional view of an alternative embodiment of the fuel flow valve illustrated in FIGS. 1 and 2.

An alternative embodiment of the fuel flow valve 4 is illustrated in FIG. 3 in which the fuel flow valve is fitted with a junction 29 normally sealed by a stopper 28. Such a junction 29 is used in some fuel flow valves for connecting the valve to purging conduits, such conduits allowing the evacuation of the fuel contained in the fuel injector conduits 10 through the channel 22 when the valve member 9 is in its second position. Instead of being connected to a purging conduit, the junction 29 may also be connected to the discharge conduit 13 as illustrated in FIGS. 1 and 2 after removal of stopper 28.

The embodiments of the invention operate identically, except for the hook-up site of the discharge conduit 13. When the fluid distribution 3 is in its first position (FIG. 1), the fuel pressure in the adaptor 16 acting on the piston 21 automatically pushes the movable valve member 9 into its first position. As a result, the pressurized fuel may pass from the fuel feed conduit into the fuel injector conduits 10. As long as the fuel pressure in the fuel injector conduits 10 is higher than the specified opening pressure (P12) of the injector valves 12, the fuel injector valves 12 will remain open and fuel may pass through the fuel injectors 11. Under these conditions, the discharge conduit 13 and the discharge valve 14 serve no function and the discharge valve 14 remains closed.

When the fluid distribution valve 3 is moved from its first position to its second position (FIG. 2) the high pressure fuel delivered by the high pressure pump 2B continues through the fuel feed conduit 17 and also passes, via conduits 27B, 23 and 19 to the second adaptor 18 so as to act on the opposite side of the movable valve member 9. The combined forces of the spring 15 and the high pressure fuel from the conduit 23 prevails over the force generated by the high pressure fuel acting on piston 20 to thereby move the valve member 9 into its second position in which the fuel injector conduits 10 communicate with the discharge conduit 13 and fuel fee conduit 17 is blocked.

Since the main fuel supply has been prevented from reaching the fuel injectors 11, the engine stops. However, the combustion chamber components may still be at elevated temperatures such that the fuel contained in the segment of the fuel injector conduits 10 between the injector valves 12 and the discharge valve 14 is heated thereby increasing its pressure. Once this fuel pressure exceeds P14, discharge valve 14 will open allowing excess fuel to escape via the discharge conduit 13 into receiver or tank 31. Since P14 is less than P12, the fuel injector valve 12 will remain closed, thereby preventing the fuel from being sprayed into the hot combustion chamber. Thus, undesired combustion within the combustion chamber is eliminated, while at the same time keeping the system components substantially filled with fuel so as to reduce subsequent engine start-up times.

In FIG. 3, although the discharge conduit 13 is connected to a pre-existing purge junction 29, this system is an improvement over the purged systems insofar as the fuel injector conduits 10 remain filled with fuel and subsequent engine start-up times are consequently reduced.

The opening pressures P12 and P14 of the valves 12 and 14, respectively, are selected such that the opening point of discharge valve 14 is close to the opening subpoint of injector valves 12 to allow only a small quantity of fuel to escape from the system.

The foregoing description is provided for illustrative purposes only and should not be construed as in any way limiting this invention, the scope of which is defined solely by the appended claims.

I claim:

1. A fuel supply system for a gas turbine engine; having a source of pressurized fuel and a fuel feed conduit connected to the source of pressurized fuel and comprising:

a) at least one fuel injector conduit having a fuel injector;

b) an injector valve located in the at least one fuel injector conduit upstream of the fuel injector, the injector valve movable between a normally closed position so as to prevent fuel flow through the fuel injector when in the closed position and on open position wherein fuel passes through the fuel injector, the injector valve opening at a fuel pressure of $P_1$;

c) a discharge conduit;

d) a discharge valve located in the discharge conduit movable between a normally closed position wherein flow through the discharge conduit is prohibited and an open position wherein flow though the discharge conduit is permitted, the discharge valve opening at a fuel pressure of $P_2$ such that $P_2<P_1$; and, e) a fuel flow valve connected to the fuel feed conduit, the at least one fuel injector conduit and the discharge conduit, the fuel flow valve having a valve member movable between a first position allowing fluid communication between the fuel feed conduit and the at least one fuel injector conduit while closing the discharge conduit and a second position allowing fluid communication between the at least one fuel injector conduit and the discharge conduit while closing the fuel feed conduit.

2. The fuel supply system of claim 1 wherein $0.9\ P_1<P_2<P_1$.

3. The fuel supply system of claim 1 wherein the movable valve member comprises opposite facing first and second pistons.

4. The fuel supply system of claim 3 wherein the fuel flow valve has a first opening connected to the fuel feed conduit such that fuel from the feed conduit acts on the first piston so as to urge the valve ember to its first position.

5. The fuel supply system of claim 4 further comprising:

a) a second opening in the fuel flow valve located such that fluid passing through the opening acts on the second piston; and, b) a fluid distribution valve connected to the source of pressurized fuel, the fuel feed conduit and the second opening in the fuel flow valve such that the fluid distribution valve is movable between a first position wherein high pressure fuel acts on the first piston and low pressure fuel acts on the second piston so as to move the valve member to its first position and a second position wherein high pressure fuel acts on both first and second pistons.

6. The fuel supply system of claim 5 further comprising biasing means acting on the valve member to bias the valve member toward its second position.

\* \* \* \* \*